(No Model.)

J. T. COULTER.
HEDGE TRIMMING ATTACHMENT FOR MOWING MACHINES.

No. 589,420. Patented Sept. 7, 1897.

Witnesses:
F. G. Fischer
G. W. Thorpe

Inventor:
John T. Coulter
By Higdon & Higdon
Attys.

THE NORRIS PETERS CO., PHOTO-LITHO., WASHINGTON, D. C.

UNITED STATES PATENT OFFICE.

JOHN T. COULTER, OF MORSE, KANSAS.

HEDGE-TRIMMING ATTACHMENT FOR MOWING-MACHINES.

SPECIFICATION forming part of Letters Patent No. 589,420, dated September 7, 1897.

Application filed August 17, 1896. Serial No. 603,029. (No model.)

*To all whom it may concern:*

Be it known that I, JOHN T. COULTER, of Morse, Johnson county, Kansas, have invented certain new and useful Improvements in Hedge-Trimming Attachments for Mowing-Machines, of which the following is a full, clear, and exact description, reference being had to the accompanying drawings, forming a part thereof.

My invention relates to hedge-trimmers; and my object is to produce a hedge-trimmer attachment for mowing-machines which may be easily and quickly adjusted vertically and which is simple, strong, durable, and inexpensive of construction.

To these ends the invention consists in certain novel and peculiar features of construction and combinations of parts, as will be hereinafter described and claimed.

In order that the invention may be fully understood, I will proceed to describe it with reference to the accompanying drawings, in which—

Figure 1:
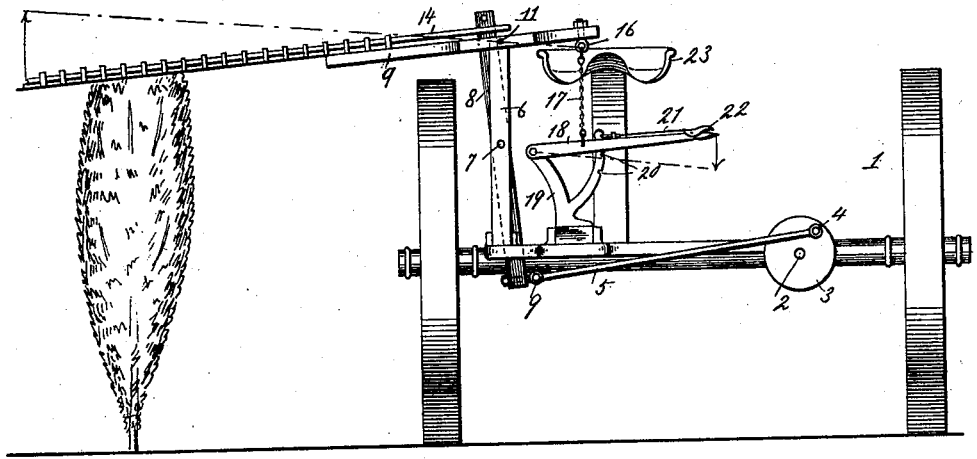
Figure 2:
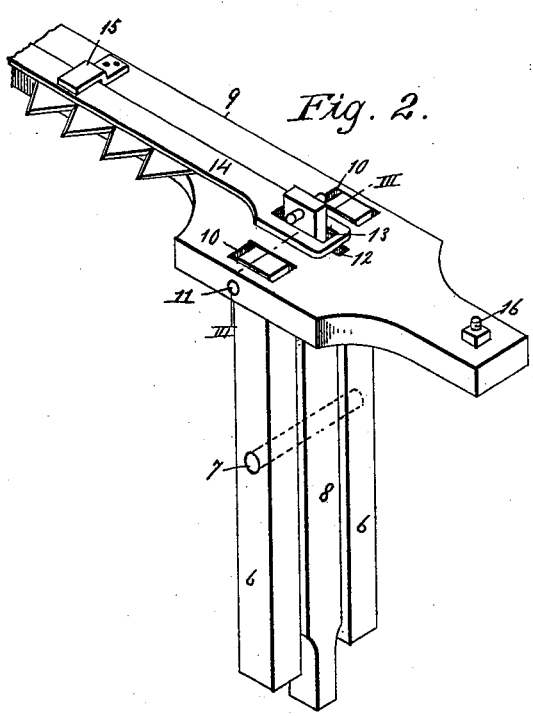
Figure 3:
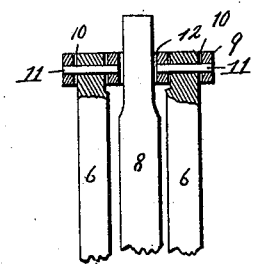

Figure 1 represents a front view of a mowing-machine provided with my improved hedge-trimming attachment. Fig. 2 represents a perspective view of my improvement, on an enlarged scale. Fig. 3 represents a vertical section taken on the line III III of Fig. 2.

Referring to the drawings in detail, 1 designates a mowing-machine of any suitable or preferred type of construction. 2 designates a longitudinal rotary shaft of said machine, and 3 a disk mounted upon the front end of the same, to which is connected by the wristpin 4 the pitman 5.

Referring to my attachment in detail, 6 6 designate a pair of vertical standards, which are secured rigidly at their lower ends to the frame of the machine in any suitable manner, and pivotally mounted upon the pin 7, connecting said standards, is a rock-bar 8, said rock-bar being arranged to operate in a vertical plane and transversely of the machine. 9 designates a sickle-carrying frame. It is provided near its inner end with the openings 10, into which project the upper ends of the standards 6, and is pivotally mounted upon pins 11, carried by said standards, as shown most clearly in Fig. 3. It is also provided with a longitudinal slot 12, arranged between the slots 10, and through said slot 12 the upper end of the rock-bar 8 projects. The bar 8 also projects through the longitudinal slot 13 of the reciprocating cutter or sickle bar 14, mounted upon said frame 9 in the guides 15, or it may be otherwise guided. In order to adjust said frame 9 to a higher or lower altitude, it is provided at its inner end with the eyebolt 16, and said eyebolt is connected by means of the chain or cable 17 with the lever 18, mounted upon the sector 19, carried by the frame of the machine. Said sector is provided with notches 20 to be engaged by the dog 21, carried by said lever, said dog being provided with the customary gripping handle or lever 22, by which it is retracted when necessary or desirable. This lever 18 is within convenient reach of the driver when upon the seat 23 and may extend transversely, as shown, or longitudinally of the machine. The lower end of the rock-bar 8 is pivotally connected, as at 9, to the pitman 5, and consequently as the machine moves across the field the rotation of the disk 3 keeps up a constant reciprocation of the cutting mechanism.

In practice the machine is driven along near a hedge within the field or on the road, as the case may be, and the cutting mechanism arranged at the proper height, as shown at Fig. 1, so that it will positively and reliably trim the hedge as required.

From the above description it is apparent that I have produced hedge-trimming attachments for mowing-machines which are positive and reliable in operation and simple, strong, durable, and inexpensive of construction.

Having thus described the invention, what I claim as new, and desire to secure by Letters Patent, is—

1. A hedge-trimmer, comprising a pair of standards, a frame mounted pivotally thereon, cutting mechanism carried by said frame, and a rock-bar pivotally mounted between said standards and connected to said cutting mechanism, substantially as described.

2. A hedge-trimmer, comprising a pair of standards, a frame mounted pivotally thereon, provided with a slot, cutting mechanism carried by said frame and provided with a registering slot, a rock-bar projecting up through said registering slots and pivotally mounted between said standards, and means to rock said bar, substantially as described.

3. A hedge-trimmer, comprising a pair of standards, a frame mounted pivotally thereon, provided with a slot, cutting mechanism carried by said frame and provided with a registering slot, a rock-bar projecting up through said registering slots and pivotally mounted between said standards, means to rock said bar, and means to pivotally adjust said frame in order to raise or lower the cutting mechanism, substantially as described.

4. The combination with a mowing-machine, provided with a rotating disk and a pitman connected thereto, of a hedge-trimming attachment, consisting of a pair of standards secured to the frame of the machine, a rock-bar pivotally mounted between the same and connected to said pitman at its lower end, a frame pivotally mounted upon said standards and provided with a slot through which said rock-bar projects, a reciprocating cutter-bar upon said frame and provided with a registering slot through which said rock-bar also projects, and means to adjust vertically said frame, substantially as described.

In testimony whereof I affix my signature in the presence of two witnesses.

JOHN T. COULTER.

Witnesses:
G. Y. THORPE,
JAMES S. M. HUNTER.